US012566063B2

(12) United States Patent
Shi et al.

(10) Patent No.: US 12,566,063 B2
(45) Date of Patent: Mar. 3, 2026

(54) DEVICE FOR CALIBRATING LASER LEVEL

(71) Applicant: NORTHWEST INSTRUMENT INC.,
Dover, NJ (US)

(72) Inventors: Xin Shi, Shanghai (CN); David Xing,
Dover, NJ (US)

(73) Assignee: NORTHWEST INSTRUMENT INC.,
Dover, NJ (US)

( * ) Notice: Subject to any disclaimer, the term of this
patent is extended or adjusted under 35
U.S.C. 154(b) by 0 days.

(21) Appl. No.: 18/530,359

(22) Filed: Dec. 6, 2023

(65) Prior Publication Data

US 2024/0133681 A1 Apr. 25, 2024

Related U.S. Application Data

(63) Continuation-in-part of application No. 18/149,042,
filed on Dec. 30, 2022, now Pat. No. 11,859,999, and
(Continued)

(30) Foreign Application Priority Data

Dec. 31, 2020 (CN) ......................... 202011629145.X

(51) Int. Cl.
*G01C 25/00* (2006.01)
*G01B 11/26* (2006.01)
(52) U.S. Cl.
CPC .................................... *G01B 11/26* (2013.01)
(58) Field of Classification Search
CPC ....... G01C 25/00; G01C 15/006; G01B 11/26
(Continued)

(56) References Cited

U.S. PATENT DOCUMENTS 11,859,999 B2 * 1/2024 Shi .......................... G01C 25/00
2010/0256940 A1 10/2010 Ogawa et al.
(Continued)

FOREIGN PATENT DOCUMENTS

CN 2465179 Y 12/2001
CN 104949689 A 9/2015
(Continued)

OTHER PUBLICATIONS

The World Intellectual Property Organization (WIPO) International
Search Report for PCT/CN2021/104657 Sep. 28, 2021 7 Pages
(including translation).

*Primary Examiner* — Robert R Raevis
(74) *Attorney, Agent, or Firm* — Anova Law Group,
PLLC

(57) ABSTRACT

A device for calibrating a laser level includes a base plat-
form, a target, and an image recognition device. The base
platform is configured to support the laser level that is to be
mounted on the base platform at a first position. The target
is arranged at a second position of the base platform and
configured to receive a laser. The image recognition device
is configured to obtain images of lasers projected on the
target before and after the laser level rotates a first angle,
determine, based on an image recognition result of the
images, positions of the lasers emitted by the laser level to
determine a deviation distance, and determine whether the
laser level needs to be calibrated based on the deviation
distance. The deviation distance is determined by position
data of the first position and the second position, and the first
angle.

20 Claims, 7 Drawing Sheets

Related U.S. Application Data a continuation of application No. PCT/CN2021/104657, filed on Jul. 6, 2021.

(58) Field of Classification Search
USPC ..... 356/138–155, 399, 400, 243.1; 33/1 DD, 33/366.16, 366.23; 73/1.01, 1.75
See application file for complete search history.

(56) References Cited

U.S. PATENT DOCUMENTS

| | | |
|---|---|---|
| 2013/0258340 A1 | 10/2013 | Trummer et al. |
| 2014/0202011 A1 | 7/2014 | Munroe et al. |

FOREIGN PATENT DOCUMENTS

| | | | |
|---|---|---|---|
| CN | 205300605 U | | 6/2016 |
| CN | 108332708 A | | 7/2018 |
| CN | 108489516 A | | 9/2018 |
| CN | 111024118 A | | 4/2020 |
| CN | 112611399 A | | 4/2021 |
| CN | 214333822 U | | 10/2021 |
| EP | 2741049 | * | 6/2014 |
| WO | 2020141069 A1 | | 7/2020 |

* cited by examiner

230

| | | |
|---|---|---|
| | | +45 |
| | | +42 |
| | | +39 |
| | | +36 |
| | | +33 |
| | | +30 |
| | | +27 |
| | | +24 |
| | | +21 |
| | | +18 |
| | | +15 |
| | | +12 |
| | | +9 |
| | | +6 |
| | | +3 |
| | | 0 |
| | | −3 |
| | | −6 |
| | | −9 |
| | | −12 |
| | | −15 |
| | | −18 |
| | | −21 |
| | | −24 |
| | | −27 |
| | | −30 |
| | | −33 |
| | | −36 |
| | | −39 |
| | | −42 |
| | | −45 |
| | | −48 |

X 0 Degree Direction

| +50 | +49 | +48 |
| +47 | +46 | +45 |
| +44 | +43 | +42 |
| +41 | +40 | +39 |
| +38 | +37 | +36 |
| +35 | +34 | +33 |
| +32 | +31 | +30 |
| +29 | +28 | +27 |
| +26 | +25 | +24 |
| +23 | +22 | +21 |
| +20 | +19 | +18 |
| -17 | +16 | +15 |
| +14 | +13 | +12 |
| +11 | +10 | +9 |
| +8 | +7 | +6 |
| +5 | +4 | +3 |
| +2 | +1 | 0 |
| -1 | -2 | -3 |
| -4 | -5 | -6 |
| -7 | -8 | -9 |
| -10 | -11 | -12 |
| -13 | -14 | -15 |
| -16 | -17 | -18 |
| -19 | -20 | -21 |
| -22 | -23 | -24 |
| -25 | -26 | -27 |
| -28 | -29 | -30 |
| -31 | -32 | -33 |
| -34 | -35 | -36 |
| -37 | -38 | -39 |
| -40 | -41 | -42 |
| -43 | -44 | -45 |
| -46 | -47 | -48 |
| -49 | -50 | -51 |

DEVICE FOR CALIBRATING LASER LEVEL

CROSS-REFERENCES TO RELATED APPLICATIONS

This application is a continuation-in-part application of U.S. patent application Ser. No. 18/149,042 filed on Dec. 30, 2022, which in turn is a continuation application of International Application No. PCT/CN2021/104657, filed on Jul. 6, 2021, which in turn claims priority of Chinese patent application No. 202011629145.X, filed with the State Intellectual Property Office of P. R. China on Dec. 31, 2020, the entire contents of all of which are incorporated herein by reference in their entirety.

TECHNICAL FIELD

The present disclosure relates to the laser measurement field and, more particularly, to a device for calibrating a laser level.

BACKGROUND

A fixed distance is usually used in a traditional method of calibrating a laser level, for example, a fixed distance of 5 meters or 10 meters. Then, the laser level and a detector are fixed at predetermined positions, respectively, to perform calibration on the laser level at the fixed distance.

In such a calibration system, a specific laser detector is usually configured to detect a height of a plane where laser emitted by the laser level is. Then, whether the laser level needs to be calibrated is determined according to a height difference between positions on the laser detector encountered by lasers, which are formed before or after by rotating the laser level for a certain angle. The height difference must be detected by the laser detector having a laser detection function. Thus, the laser level must be calibrated by using the laser detector. The scene and tool for calibrating the laser level are limited. The calibration system cannot be configured to realize automatic calibration.

SUMMARY

In view of the deep understanding of the problems existing in the background technology, the inventor of the present disclosure thinks of designing a kind of image recognition technology to determine a height difference of the lasers formed before and after by rotating the laser level for a certain angle at a target. Thus, in one aspect, the cost of the system may be reduced. On another aspect, calibration accuracy may be improved since the image recognition technology has relatively high accuracy.

Embodiments of the present disclosure provide a device for calibrating a laser level, including a base platform, a target, and an image recognition device. The base platform is configured to support the laser level that is to be mounted on the base platform at a first position. The target is arranged at a second position of the base platform and configured to receive a laser. The image recognition device is configured to obtain images of lasers projected on the target before and after the laser level rotates a first angle, determine, based on an image recognition result of the images, positions of the lasers emitted by the laser level to determine a deviation result such as a deviation distance, and determine whether the laser level needs to be calibrated based on the deviation result such as a deviation distance. The deviation distance is determined by position data of the first position and the second position, and the first angle.

In an embodiment of the present disclosure, the image recognition device is arranged at a third position on a side of the target facing the laser level. Those skilled in the art should know that when the image recognition device is arranged at a third position on a side of the target facing the laser level, the image recognition device can easily recognize the position of the laser on the target to improve the recognition accuracy.

In an embodiment of the present disclosure, wherein the image recognition device includes a smart phone, a tablet computer, and/or a camera. As such, existing apparatuses owned by the user of the device for calibrating the laser level may be reused to further reduce the apparatus cost of calibrating the laser level.

In an embodiment of the present disclosure, the base platform further includes a rotation device configured to rotate the laser level by the first angle based on a control instruction received from the image recognition device. Thus, the rotation angle of the laser level can be controlled in a more accurate manner.

In an embodiment of the present disclosure, the first angle is an angle value of 180 degrees, 90 degrees, or 270 degrees. Thus, those skilled in the art should know that these three angles are merely exemplary not limiting. With these angles, the calibration parameter may be easily calculated. With other angles, the calibration may also be realized. Thus, the technical solutions of other angles may be also included in the technical solutions claimed by the independent claims of the present disclosure.

In an embodiment of the present disclosure, when the image recognition device determines that the laser level needs to be calibrated, the image recognition device determines a calibration signal based on the distance data, the deviation distance, and the first angle and sends the calibration signal to the laser level. In an embodiment of the present disclosure, the device further includes an optical path extension device arranged at a fourth position between the laser level and the target and configured to receive the laser emitted by the laser level and project the laser onto the target after being adjusted by the optical path extension device. In an embodiment of the present disclosure, the optical path extension device includes an objective lens configured to receive the laser emitted by the laser level, an objective focusing lens configured to perform focusing processing on the laser received by the objective lens, and an eyepiece configured to project the laser adjusted by the objective focusing lens onto the target. As such, the laser can be processed by the objective focusing lens after being received by the objective lens and then projected by the eyepiece and onto the target. Thus, the physical distance between the laser level and the target may be enlarged in an optical manner after the laser being processed by the objective focusing lens.

In an embodiment of the present disclosure, the optical path extension device further includes a crosshair reticle arranged between the objective focusing lens and the eyepiece. In an embodiment of the present disclosure, the objective lens is a group of objective lenses. In an embodiment of the present disclosure, the optical path extension device has a first times of an optical path extension times. In an embodiment of the present disclosure, the optical path extension device is configured as a level, an optical path center of the level being aligned with the laser emitted by the laser level.

In an embodiment of the present disclosure, a wired connection or a wireless connection exists between the image recognition device and the laser level, the wired connection or the wireless connection being configured to transmit the calibration signal from the image recognition device to the laser level. In an embodiment of the present disclosure, the wireless connection includes at least one connection manner of an infrared connection, a Bluetooth connection, or a WiFi connection. In an embodiment of the present disclosure, the target includes any one of a horizontal scale, a black color block, a black and white grid scale, a cross scale, and/or a high and low scale.

In summary, the device for calibrating the laser level of the present disclosure may perform the calibration on the laser level by means of the image recognition device and have the simple structure and the high calibration accuracy.

BRIEF DESCRIPTION OF THE DRAWINGS

Embodiments are shown and explained with reference to the accompanying drawings. The drawings are used to clarify basic principles and thus show only aspects necessary to understand the basic principles. The drawings are not according to scale. In the drawings, same reference numbers represent similar features.

FIG. 2 is a schematic diagram showing a target used in the device configured to calibrate the laser level according to an embodiment of the disclosure shown in FIG. 1.

FIG. 5 is a schematic diagram showing a target at zero degree used in the device configured to calibrate the laser level according to an embodiment of the disclosure shown in FIG. 1.

FIG. 6 is a schematic diagram showing a target at 180 degrees used in the device configured to calibrate the laser level according to an embodiment of the disclosure shown in FIG. 1.

Figure 1:
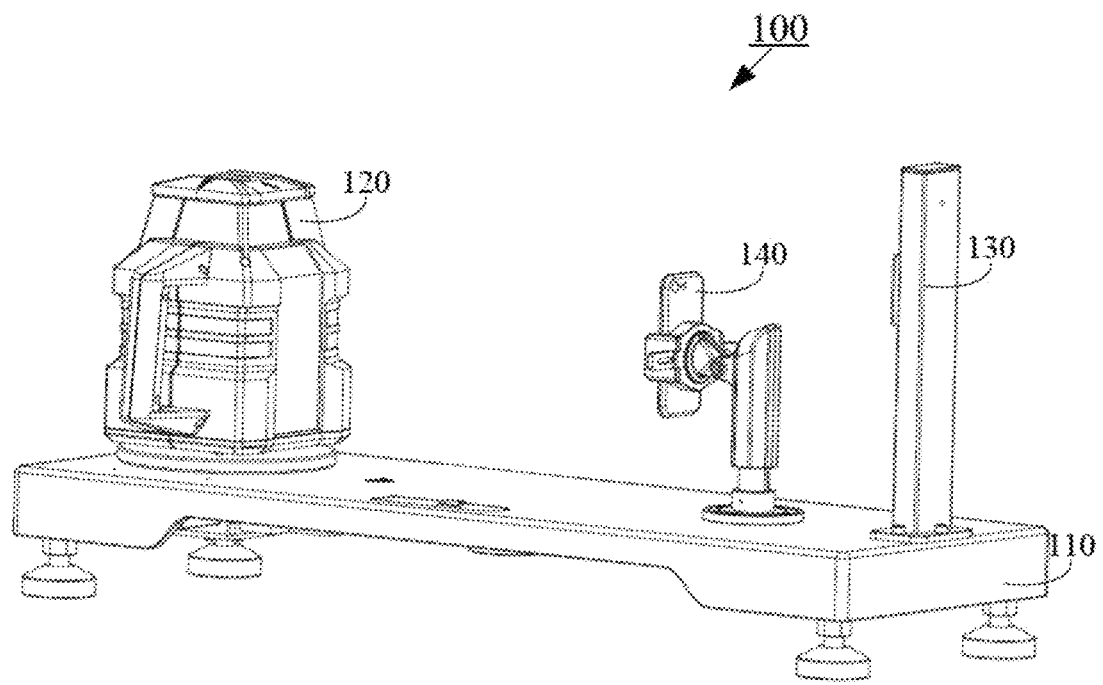
FIG. 1 is a schematic structural diagram of a device configured to calibrate a laser level according to an embodiment of the disclosure.

Other features, characteristics, advantages, and benefits of the present disclosure may become more apparent from the following detailed description in connection with the accompanying drawings.

DETAILED DESCRIPTION OF THE EMBODIMENTS

For the following detailed description of preferred embodiments, reference will be made to the accompanying drawings which form a part of the present disclosure. The accompanying drawings show specific embodiments in which the present disclosure can be realized through examples. Exemplary embodiments are not intended to be exhaustive of all embodiments according to the present disclosure. It can be understood that other embodiments may be used and structural or logical modifications may be made without departing from the scope of the present disclosure. Therefore, the following detailed description is not intended to be limiting, and the scope of the present disclosure is defined by the appended claims.

In order to solve the technical problem in the existing technology that a laser detector must be used to sense the height difference for calibrating a laser level, the inventors of the present disclosure thought of designing a method to determine the height difference of lasers formed before and after by rotating the laser level for a certain angle on the target. Thus, on one hand, there is a relatively great possibility to reduce the cost of the system. On another hand, since the accuracy of the image recognition technology is relatively high, the calibration accuracy may be improved. The target may include a conventional laser detector or a simple target such as a whiteboard.

Based on the above intention concept, the inventors of the present disclosure thought of designing a device for calibrating a laser level. The device may include an image recognition device. The image recognition device may be configured to obtain an image of a laser projected on a target and determine positions of lasers emitted by the laser level before and after the laser level rotates for a first angle on the target based on the image recognition technology. Then, a corresponding processor may be configured to determine whether the laser level needs to be calibrated based on a deviation based on the image recognition technology, distance data according to position data of a first position and a second position before and after the rotation of the first angle, and the first angle.

Embodiments consistent with the present disclosure use the deviation result, such as the deviation distance, to determine whether the laser level needs to be calibrated. The deviation distance is determined based on the position of the laser emitted by the laser level at a first position, on the target at a second position, before and after the laser level rotates a first angle. For example, the image recognition device may obtain a first image before the laser level rotates the first angle, and obtain a second image after the laser level rotates the first angle. The deviation distance may be the distance for the same point(s) measured in the first image and the second image. The deviation result may be the measure of one or more differences in the first image and in the second image, such as the measurement of multiple points or lines in the first image and second image. In some embodiments, different first angles may correspond to different deviation distances. For example, when the first angle is 90 degrees, the measured deviation distance may be s1, and the deviation distance threshold may be a. Whether calibration is required may be determined by whether s1 is within the range of a. For example, if s1 is less than a, calibration is not required. If s1 is greater than a, calibration is required. In another example, when the first angle is 45 degrees, the measured deviation distance is s2, and the deviation distance threshold is b. Whether calibration is required may be determined by whether s2 is within the range of b. If s2 is less than b, no calibration is required. If s2 is greater than b, calibration is required.

In addition, determining whether the laser level needs to be calibrated may also be related to the distance between the first position and the second position. The first position refers to the position of the laser level, and the second position refers to the position of the target. When the distance between the first position and the second position is different, the deviation distance is different. When the first position and the second position are in different positions, the distance between the first position and the second position is different. For example, when the distance between the first position and the second position is 10 m, the measured distance deviation may be L1, and the deviation distance threshold may be c. Whether calibration is required is determined by whether L1 is within the range of c. If L1 is less than c, calibration is not required. If L1 is greater than c, calibration is required. In another example, when the distance between the first position and the second position is 30 m, the measured deviation distance may be L2, and the deviation distance threshold at this time is d. By determining whether L2 is within the range of d, the laser level determines whether calibration is required. For example, if L2 is less than d, calibration is not required. If L2 is greater than d, calibration is required.

Therefore, whether the laser level needs to be calibrated may be determined by identifying the deviation result, such as the deviation distance, which measures the difference of the positions of the laser beams emitted by the laser level on the target before and after the laser level rotating the first angle. In some embodiments, whether the laser level needs to be calibrated may also be determined by the size of the first angle during the measurement process. In some embodiments, whether the laser level needs to be calibrated may also be determined by the distance (or the position data) between the first position and the second position. In some embodiments, whether the laser level needs to be calibrated may be determined by any combination of one or more of the aforementioned deviation results, the first angle, and the position data.

The device for calibrating the laser level disclosed according to the present disclosure is further described below in connection with the accompanying drawings.

FIG. 1 is a schematic structural diagram of a device 100 configured to calibrate a laser level according to an embodiment of the disclosure. As shown in FIG. 1, the device 100 configured to calibrate the laser level of the present disclosure includes a base platform 110. The base platform 110 may be configured to support a laser level 120 that is to be mounted on the base platform 110 at a first position (left side in FIG. 1). The device 100 further includes a target 130. The target 130 may be arranged at a second position (right side in FIG. 1) of the base platform 110 and configured to receive the laser emitted by the laser level 110. The device 100 further includes an image recognition device 140. The image recognition device 140 may be configured to obtain an image of the laser projected on the target 130 and determine positions of the lasers emitted by the laser level 110 before and after the rotation of the first angle on the target 130 based on the mage recognition technology to determine a distance deviation to further determine whether the laser level needs to be calibrated based on the deviation data, the distance data determined based on the position data of the first position and the second position, and the first angle. Thus, the image recognition device 140 may include a smartphone, a tablet computer, and/or a camera. As such, existing apparatuses owned by the user of the device 100 for calibrating the laser level 110 may be reused to further reduce the apparatus cost of calibrating the laser level 110. The device 100 for calibrating the laser level 110 of the present disclosure may not require a detector with a laser height difference recognition function and can perform the calibration on the laser level only by the image recognition device. Thus, the device may have a simple structure and high calibration accuracy.

In some embodiments, the target 130 in FIG. 1 may have various forms. For example, the target 130 may have no pattern or have various patterns. For example, the target 130 may include any one of a horizontal scale, a black color block, a black and white grid scale, a cross scale, and/or a high and low scale.

The technical solution without any pattern is first described below. When the target 130 has no pattern, the image recognition device 140 may be implemented by, for example, a cellphone. Assume that the target 130 includes a black color block. Thus, the image recognition of the image recognition device 140 may include obtaining position information of a black rectangle of the target on a screen using an algorithm such as threshold, findContours, etc., in the OpenCV framework. A coordinate of an upper left corner point of the black rectangle may be denoted as (x,y), and a height may be denoted as H. Then, the height H may be sent to a downstream machine. Then, in a dark environment, a frame with light spot may be binarized into a grayscale image by the algorithm of findContours in the openCV framework. A position of the light spot of the laser level on the screen may be obtained. Based on a coordinate of a center point of the light spot, the position may be denoted as (m, n). Thus, the position of the laser emitted by the laser level 1 on the target 130 may be identified. In addition, another possibility may exist, that is, the target 130 does not include the black color block. Thus, a distance between the image recognition device 140 and the target 130 may be required to be constant. The height of the black color block on the screen in the above solution may be a constant value H. Since the constant value H is known, thus, the height H may also be sent to the lower machine. Then, in the dark environment, the frame with the light spot may be binarized into the grayscale image through the algorithm of findContours in the openCV framework to obtain the position of the light spot of the laser level on the screen, and based on the center coordinate of the light spot, the position may be denoted as (m, n). Thus, the position of the laser emitted by the laser level 1 on the target 130 may also be recognized.

Of course, different patterns may also be provided on the target 130. Various possible pattern forms are described below.

Figure 2:
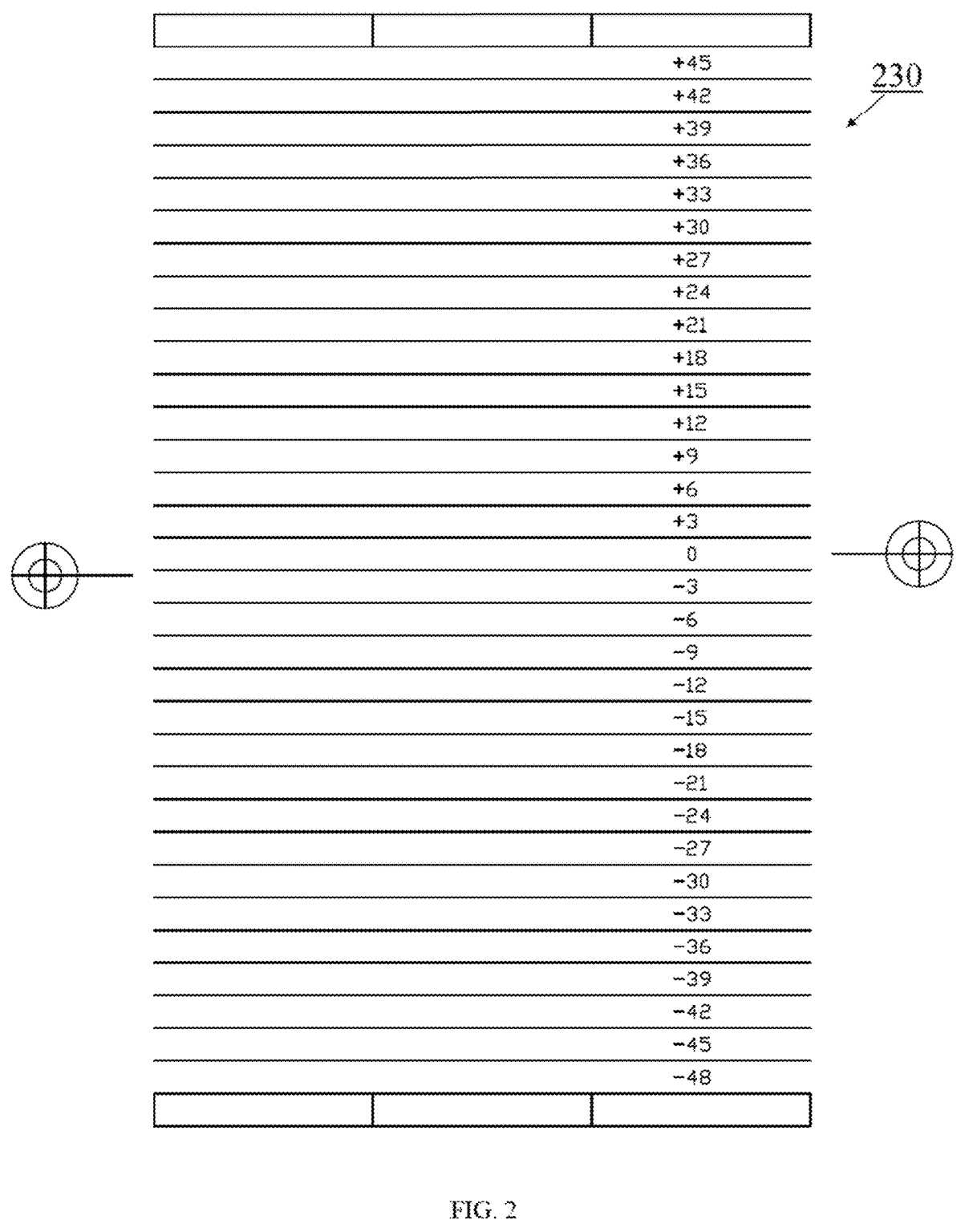

FIG. 2 a schematic diagram showing a target 230 used in the device configured to calibrate the laser level according to an embodiment of the disclosure shown in FIG. 1. As shown in FIG. 2, a line with a relevant position mark is arranged on the target 230. Thus, when the laser emitted by the laser level is close to or coincides with a line, the height of the laser emitted by the laser level may be recorded as a value recorded by a mark associated with the line. Then, the laser level may be rotated by a certain angle. A value recorded by a mark associated with another line may be recorded in the same method after the rotation of the certain angle. For example, before the rotation, the height of the laser may be associated with line marked with "+3." After the rotation of the certain angle, the height of the laser may be associated with a line marked with "−3." Thus, the height difference before and after the rotation of the certain angle may be +3−(−3), that is 6. Then, based on the height difference, the rotation angle, and the distance between the laser level and the target, whether the laser level needs to be calibrated may be determined, and a specific calibration parameter value may be calibrated when the laser level needs to be calibrated.

Figure 3:
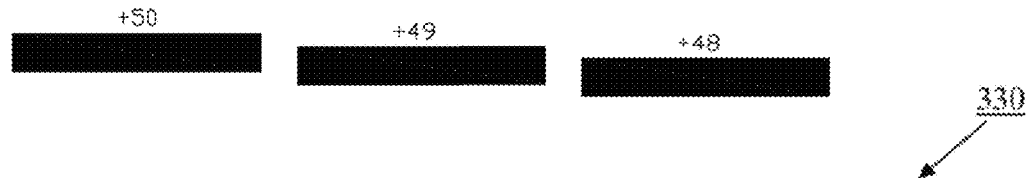
FIG. 3 is a schematic diagram showing a target used in the device configured to calibrate the laser level according to an embodiment of the disclosure shown in FIG. 1.
Figure 3:
Figure 3:
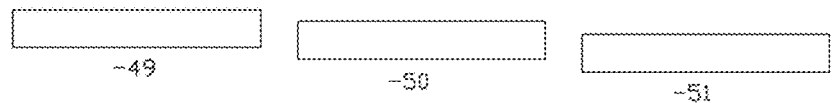

FIG. 3 is a schematic diagram showing a target 330 used in the device configured to calibrate the laser level according to an embodiment of the disclosure shown in FIG. 1. As can be shown in FIG. 3, the target 330 includes a black and white grid with relevant position marks. Thus, when the laser emitted by the laser level is close to or coincides with a black and white grid, the height of the laser emitted by the laser level may be denoted as a value recorded by a mark associated with the black and white grid. Then, the laser level may be rotated for a certain angle, a value recorded by a mark of another black and white grid may be determined in the same method after the rotation of the certain angle. For example, a distance from the laser to a reference line 0 can be 10% of a distance between the reference line 0 and black grid +50 before the rotation, which can be marked with "+5." Similarly, after the rotation of the certain angle, the distance between the laser and the reference line 0 can be 20% of the distance between the reference line 0 and the white grid −50, which can be marked with "−10." Thus, the height difference before and after the rotation of the certain angle may be +5−(−10), that is 15. Then, based on the height difference, the rotation angle, and the distance between laser level and the target, whether the laser level needs to be calibrated may be determined, and a specific calibration parameter value may be calibrated when the laser level needs to be calibrated.

Figure 4:
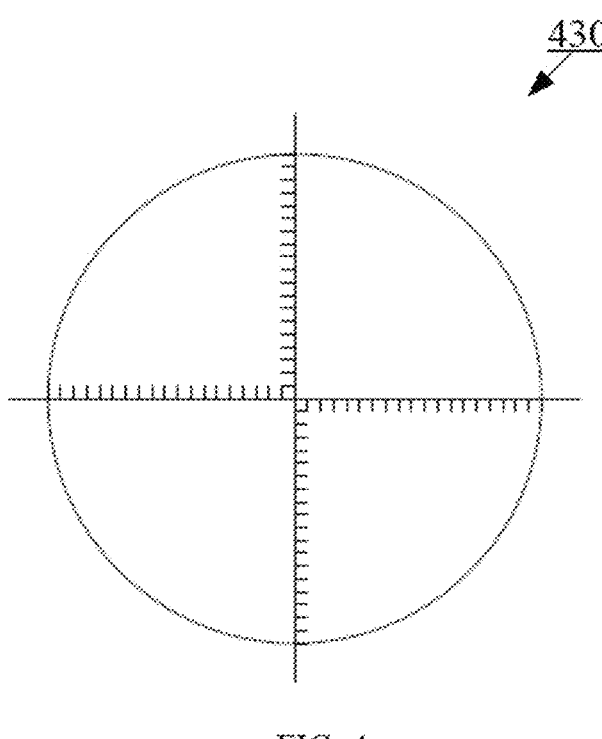
FIG. 4 is a schematic diagram showing a target used in the device configured to calibrate the laser level according to an embodiment of the disclosure shown in FIG. 1.

FIG. 4 is a schematic diagram showing a target 430 used in the device configured to calibrate the laser level according to an embodiment of the disclosure shown in FIG. 1. As shown in FIG. 4, the target 430 includes a cross scale. Thus, when the laser emitted by the laser level is close to or coincides with a scale, the height of the laser emitted by the laser level may be denoted by the scale. Then, the laser level may be rotated for a certain angle, another scale may be determined in the same method after the rotation of the certain angle. For example, before the rotation, the height may be associated with a first scale, and after the rotation, the height may be associated with a second scale. Then, a height difference before and after the rotation for the certain angle may be a difference between the first scale and the second scale. Then, whether the laser level needs to be calibrated may be determined based on the height difference, the rotation angle, and the distance between the laser level and the target. When calibration is required, a specific calibration parameter value may be calculated.

Figure 6:
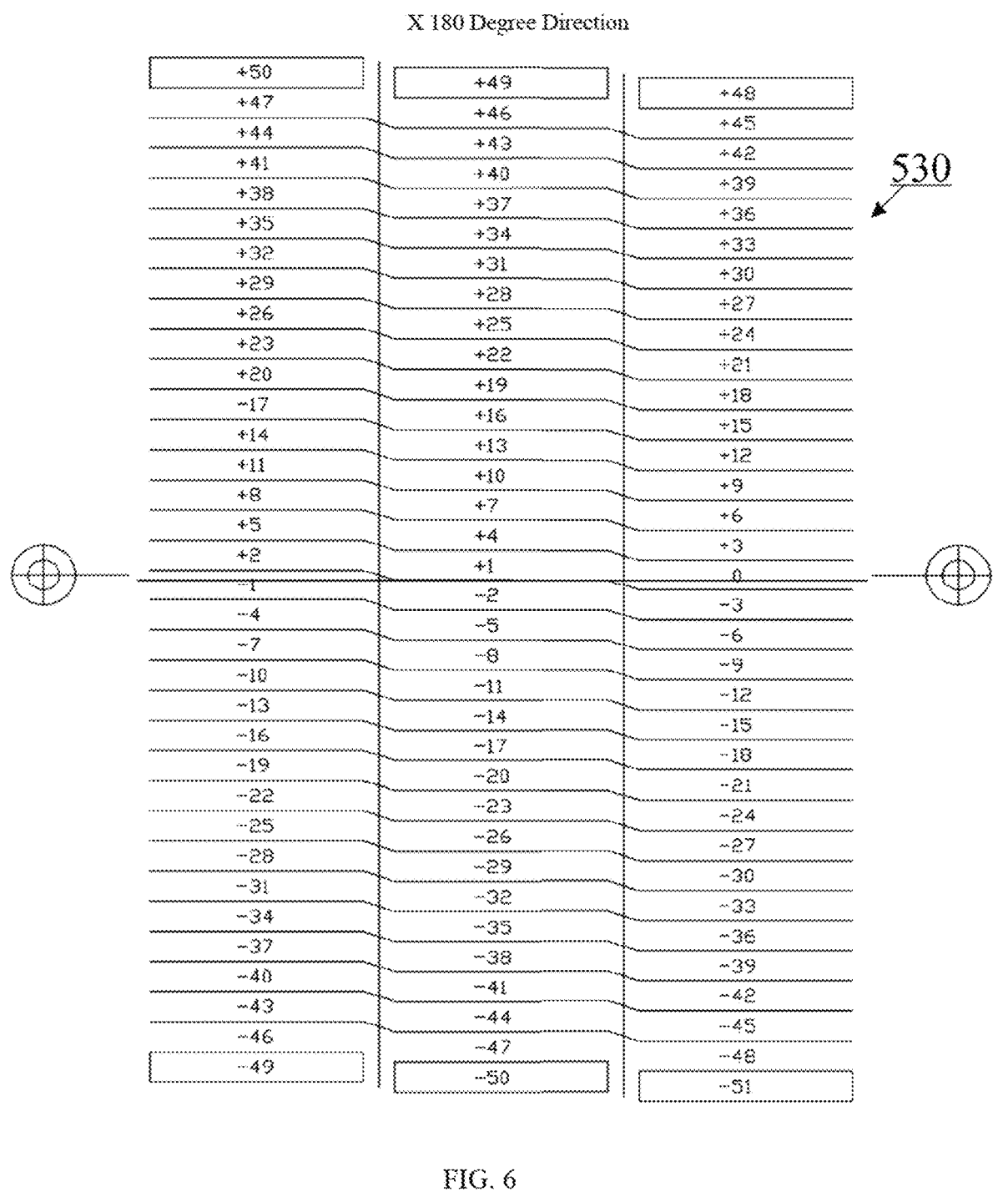

FIG. 5 is a schematic diagram showing a target 530 at zero degree used in the device configured to calibrate the laser level according to an embodiment of the disclosure shown in FIG. 1. FIG. 6 is a schematic diagram showing the target 530 at 180 degrees used in the device configured to calibrate the laser level according to an embodiment of the disclosure shown in FIG. 1. A difference between FIG. 5 and FIG. 6 with FIG. 2 includes that a horizontal scale with a large interval is included, and each horizontal scale is divided into three steps. Thus, the scale may be further refined, and a higher precision may be realized. In some embodiments, as shown in FIG. 5 and FIG. 6, a line with a relevant position mark is arranged on the target 530. Thus, when the laser emitted by the laser level is close to or coincides with a line, the height of the laser emitted by the laser level may be denoted by the value recorded by the mark associated with the line. Then, the laser level may be rotated for a certain angle, e.g., 180 degrees, the value recorded by the mark associated with another line may be determined in the same method after the rotation for the certain angle. For example, before the rotation, the height may be relevant to the line marked with "+4," and after the rotation, the height may be relevant to the line marked with "+1." Thus, the height different before and after the rotation for the certain angle may be +4−(+1), that is 3. Then, based on the height difference, the rotation angle, and the distance between the laser level and the target, whether the laser level needs to be calibrated may be determined. When calibration is required, a specific calibration parameter value may be calibrated.

In addition, the inventors of the present disclosure considered the technical problem that the device for calibrating the laser level is limited by space and thought of designing a kind of optical enlargement of the physical distance between the laser level and the target using an optical device. Thus, the physical distance may be enlarged in a limited space to improve the calibration accuracy.

Figure 7:
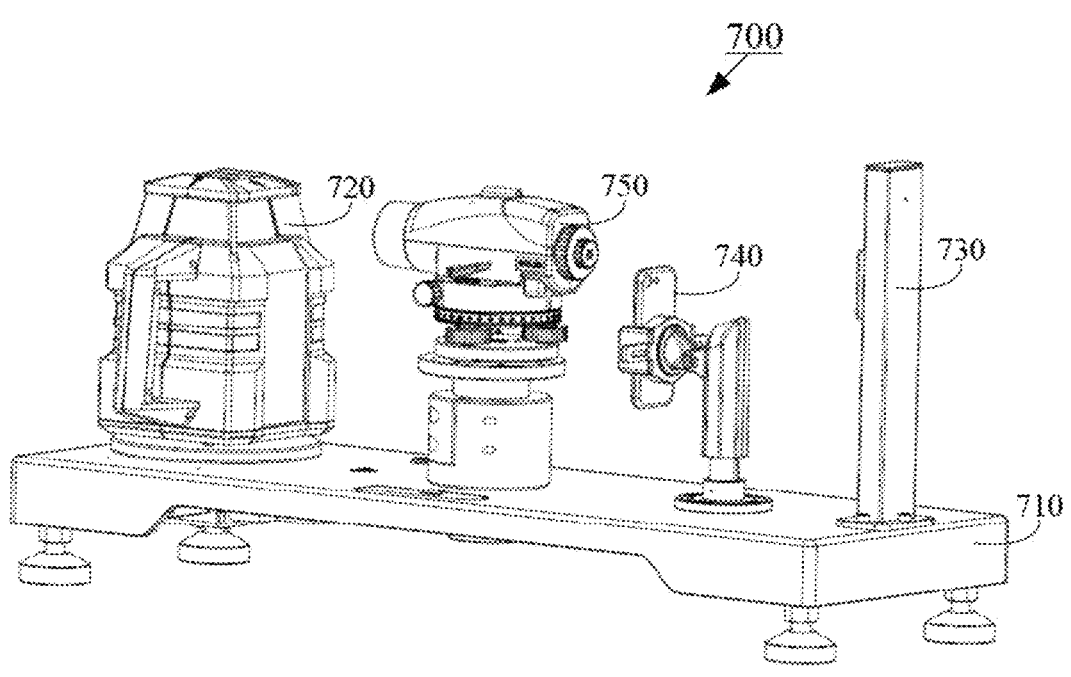
FIG. 7 is a schematic diagram showing a device configured to calibrate a laser level from an angle according to an embodiment of the disclosure.
Figure 8:
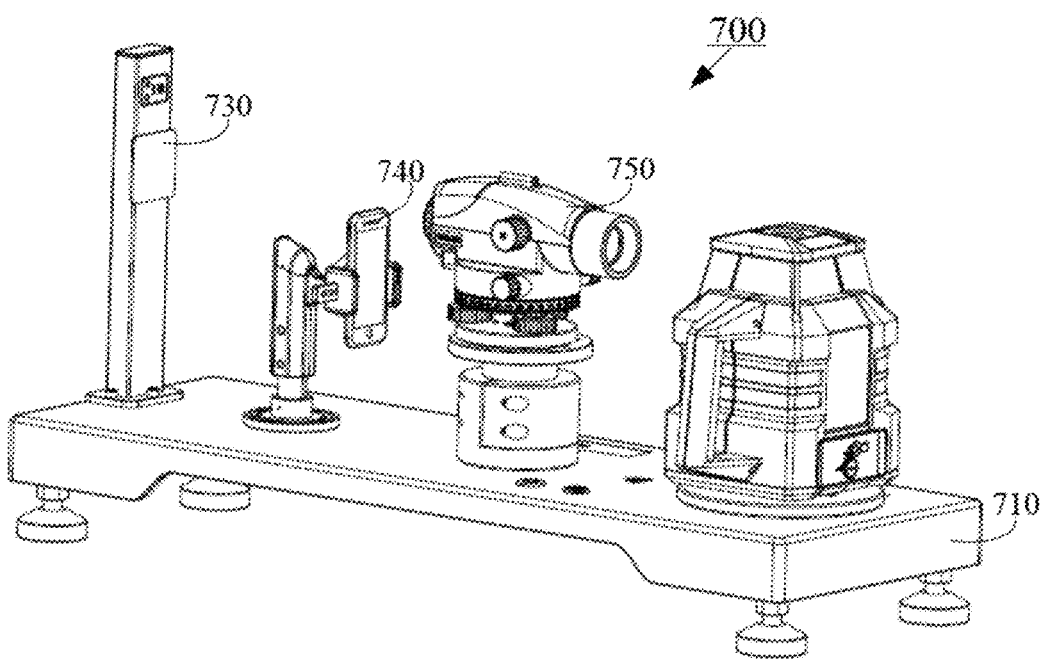
FIG. 8 is a schematic diagram showing a device configured to calibrate a laser level from another angle according to an embodiment of the disclosure.

In some embodiments, as shown in FIGS. 7 and 8, FIG. 7 is a schematic diagram showing a device 700 configured to calibrate a laser level from an angle according to an embodiment of the disclosure. FIG. 8 is a schematic diagram showing the device 700 configured to calibrate the laser level from another angle according to an embodiment of the disclosure. As shown in FIG. 7 and FIG. 8, the present disclosure provides the device 700 for calibrating the laser level, including a base platform 710. The base platform 710 may be configured to support the laser level 720 that is to be mounted on the base platform 710 at a first position. In addition, the device 700 also includes a target 730. The target 730 may be arranged at a second position of the base platform 710 and configured to receive a laser. In addition, the device 700 further includes an image recognition device 740. The image recognition device 740 may be configured to obtain the image of the laser projected on the target 730 and determine positions of lasers emitted by the laser level 720 before and after the rotation of the first angle based on the image recognition technology to determine the deviation result, such as the deviation distance. Thus, based on the deviation data, the distance data determined according to the position data of the first position and the second position, and the first angle, the device 700 may be configured to determine whether the laser level 720 needs to be calibrated. In embodiments shown in FIG. 7 and FIG. 8, the image recognition device 740 may be arranged at a third position on a side of the target 730 facing the laser level 720. Those skilled in the art should know that when the image recognition device 740 is arranged at the third position of the target 730 facing the laser level 720, the image recognition device 740 may easily recognize the position of the laser on the target 730 to improve the recognition accuracy. The base platform 710 may further include a rotation device (not shown in the drawing, e.g., right below the laser level 720). The rotation device may be configured to rotate the laser level 720 for the first angle based on a control instruction received from the image recognition device 740. Thus, the rotation angle of the laser level 720 may be controlled more accurately. In an embodiment of the present disclosure, the first angle may include one of 180 degrees, 90 degrees, or 270 degrees. Thus, those skilled in the art should know that these three angles are merely exemplary not limiting. With these angles, the calibration parameter may be easily calculated. With other angles, the calibration may also be realized. Thus, the technical solutions of other angles may be also included in the technical solutions claimed by the independent claims of the present disclosure. In an embodiment of the present disclosure, when the image recognition device determines that the laser level needs to be calibrated, the image recognition device may determine a calibration signal based on the distance data, the deviation distance, and the first angle and send the calibration signal to the laser level.

In addition to this, the device 700 also includes an optical path extension device 750. The optical path extension device 750 may be arranged at a fourth position between the laser level 720 and the target 730 and configured to receive the laser emitted by the laser level 720 and project to the target 730 after the laser is adjusted by the optical path extension device 750. More preferably, in an embodiment of the present disclosure, the optical path extension device 750 may include an objective lens. The objective lens may be configured to receive the laser emitted by the laser level. The optical path extension device 750 may further include an objective focusing lens. The objective focusing lens may be configured to perform focusing processing on the laser received by the objective lens. The optical path extension device 750 may further include an eyepiece. The eyepiece may be configured to project the laser focused by the objective focusing lens to the target. As such, the laser can be processed by the objective focusing lens after being received by the objective lens and then projected by the eyepiece and onto the target. Thus, the physical distance between the laser level and the target may be enlarged in an optical manner after the laser being processed by the objective focusing lens.

In addition, further preferably, in an embodiment of the present disclosure, the optical path extension device 750 may further include a crosshair reticle. The crosshair reticle may be arranged between the objective focusing lens and the eyepiece and configured to perform assistant alignment on the laser. In an embodiment of present disclosure, the objective lens may include a set of objective lenses. In an embodiment of the present disclosure, the optical path extension device may include a first times of an optical extension times. Preferably, in an embodiment of the present disclosure, the first times may be 32 times or 26 times. An appropriate times may be selected according to actual needs. Preferably, in an embodiment of the present disclosure, the optical path extension device may be configured as a level. An optical path center of the level may be aligned with the laser emitted by the laser level.

In an embodiment of the present disclosure, a wired connection or a wireless connection may exist between the image recognition device 740 and the laser level 720. The wired connection or the wireless connection may be configured to transmit a calibration signal from the image recognition device 740 to the laser level 720. Optionally, in an embodiment of the present disclosure, the wireless connection may include at least one connection of an infrared connection, a Bluetooth connection, or a WiFi connection.

In summary, the device for calibrating the laser level of the present disclosure may not need a laser detector to detect and identify changes in the laser position. A suitable target object may be selected as the target according to the application scenario. Thus, the laser level may be calibrated only by the image recognition device and have a wide application range, a simple structure, and high calibration accuracy.

Although various exemplary embodiments of the present disclosure have been described, various changes and modifications may be performed on the device apparent to those skilled in the art. One or some of the advantages of the present disclosure may be realized without departing from the spirit and scope of the content of the present disclosure. For those skilled in the art, other components performing the same function may be replaced appropriately. The features explained herein with reference to a particular figure may be combined with features of other figures, even in those cases where this is not explicitly mentioned. Furthermore, the methods of the present disclosure may be implemented either in all software implementations using appropriate processor instructions or in hybrid implementations that utilize a combination of hardware logic and software logic to achieve the same results. Such modifications to the solution according to the present disclosure are intended to be covered by the appended claims.

What is claimed is:

1. A laser level calibrating device, comprising:
a laser level at a first position and configured to emit a laser;
a target at a second position and configured to receive a laser; and
an image recognition device, positioned between the laser level and the target, and configured to obtain images of lasers emitted by the laser level and projected onto the target before and after the laser level rotating a first angle to determine a deviation distance, and to further determine whether to calibrate the laser level based on the deviation distance.

2. The laser level calibrating device of claim 1, wherein the image recognition device is further configured to determine whether to calibrate the laser level based on a distance data determined based on position data of the first position and the second position.

3. The laser level calibrating device of claim 2, wherein the image recognition device is further configured to determine whether to calibrate the laser level based on the first angle.

4. The laser level calibrating device of claim 2, wherein the image recognition device is further configured to determine whether to calibrate the laser level based on whether the deviation distance is longer than a threshold.

5. The laser level calibrating device of claim 1, wherein the image recognition device includes a base platform configured to support the laser level at a first position, and the base platform includes a rotation device configured to rotate the laser level by the first angle specified by the image recognition device.

6. The laser level calibrating device of claim 1, wherein the image recognition device includes a smart phone, a tablet computer, and/or a camera.

7. The laser level calibrating device of claim 1, further comprising:
an optical path extension device positioned between the laser level and the target and configured to receive the laser emitted by the laser level and project the laser onto the target after being adjusted by the optical path extension device.

8. The device according to claim 7, wherein the optical path extension device includes:
an objective lens configured to receive the laser emitted by the laser level;
an objective focusing lens configured to perform focusing processing on the laser received by the objective lens; and
an eyepiece configured to project the laser adjusted by the objective focusing lens onto the target.

9. The device according to claim 8, wherein the optical path extension device further includes a crosshair reticle arranged between the objective focusing lens and the eyepiece.

10. The device according to claim 8, wherein the objective lens is a group of objective lenses.

11. The device according to claim 7, wherein the optical path extension device has a first multiplication value of an optical path extension times.

12. The device according to claim 7, wherein the optical path extension device includes an optical path center aligned with the laser emitted by the laser level.

13. The device according to claim 1, wherein a wired connection or a wireless connection exists between the image recognition device and the laser level, the wired connection or the wireless connection being configured to transmit a calibration signal from the image recognition device to the laser level for the laser level to perform calibration.

14. The device according to claim 13, wherein the wireless connection includes at least one connection manner of an infrared connection, a Bluetooth connection, or a WiFi connection.

15. The device according to claim 1, wherein the target includes one of a horizontal scale, a black color block, and a black and white grid scale.

16. A method for determining calibration of a laser level, implemented by one or more processors of an image recognition device, the method comprising:

obtaining a first image based on a first laser emitted by a laser level at a first position and received by a target at a second position, wherein the image recognition device is positioned between the laser level and the target;

obtaining a second image based on a second laser emitted by the laser level at the first position and received by the target at the second position after the laser level rotates a first angle;

determining a deviation distance based on the first image and the second image on the target; and determining whether to calibrate the laser level based on the deviation distance.

17. The method of claim 16, wherein determining whether to calibrate the laser level comprises:

determining, by the image recognition device, that the laser level needs to be calibrated based on the deviation distance corresponding to the first image and the second image being longer than a threshold.

18. The method of claim 16, wherein determining whether to calibrate the laser level comprises:

determining, by the image recognition device, that the laser level needs to be calibrated based on position data corresponding to the first position and the second position.

19. The method of claim 16, wherein determining whether to calibrate the laser level comprises:

determining, by the image recognition device, that the laser level needs to be calibrated based on position data corresponding to the first position and the second position, and the first angle.

20. The method of claim 16, wherein the laser level is situated on a base platform configured to support the laser level, and the base platform includes a rotation device configured to rotate the laser level by the first angle specified by the image recognition device.

* * * * *